United States Patent [19]

Miller et al.

[11] 4,030,432
[45] June 21, 1977

[54] CAN TRIMMING APPARATUS

[75] Inventors: Stanley J. Miller, Hastings; Richard J. Heniser, Grand Rapids, both of Mich.

[73] Assignee: Gulf & Western Manufacturing Company (Hastings), Southfield, Mich.

[22] Filed: Dec. 5, 1975

[21] Appl. No.: 636,978

Related U.S. Application Data

[63] Continuation-in-part of Ser. No. 543,930, Jan. 24, 1975, abandoned.

[52] U.S. Cl. .................................................. 113/7 R
[51] Int. Cl.² ........................................ B21D 24/16
[58] Field of Search ............. 113/1 G, 7 A, 120 N, 113/120 M, 7 R; 83/3, 54, 856; 72/332, 338

[56] References Cited

UNITED STATES PATENTS

| | | | |
|---|---|---|---|
| 3,130,698 | 4/1964 | Knowles | 113/7 R |
| 3,232,260 | 2/1966 | Siemonsen | 113/7 A |
| 3,359,841 | 12/1967 | Cracho et al. | 83/54 |
| 3,802,363 | 4/1974 | Langewis | 113/7 R |

*Primary Examiner*—Othell M. Simpson
*Assistant Examiner*—Z. R. Bilinsky
*Attorney, Agent, or Firm*—Meyer, Tilberry & Body

[57] ABSTRACT

Apparatus is provided for trimming the open end of a seamless cup-shaped metal can body. The apparatus includes a plurality of spindle units receiving and supporting can bodies to be trimmed for movement along an arcuate path. The spindle units cooperate to axially position the can bodies relative to a fixed cutting blade positioned along the path and past which the can bodies are moved. During movement of the spindle units along the path and between input and output stations of the apparatus, can bodies supported thereby are rotated about the corresponding spindle axis. As each can body moves past the fixed cutting blade it is rotated one complete revolution to sever an annular scrap ring from the open end thereof. Thereafter, the trimmed can and scrap ring are displaced from the spindle unit and discharged from the apparatus.

35 Claims, 10 Drawing Figures

CAN TRIMMING APPARATUS

This application is a continuation-in-part of application Ser. No. 543,930 filed Jan. 24, 1975 now abandoned.

This invention relates to the art of can making and, more particularly, to apparatus for edge trimming the open end of a drawn, cup-shaped metal can body.

It is well known that cup-shaped metal can bodies can be formed by drawing and ironing a cup-shaped blank to a desired axial length and wall thickness. The open end of the resulting cup-shaped can body has an irregular edge which must be trimmed so that the can bodies are of uniform height or axial length. Often, apparatus for edge trimming the open end of such a can body is associated with a drawing and ironing press to receive the untrimmed can bodies as they are discharged from the press. Such can forming presses operate at a relatively high speed having an output, for example, of 300 to 500 cans per minute. Accordingly, edge trimming apparatus associated with the output side of the press must have a corresponding output capability in order to achieve a desired continuous operation of the equipment in the can making line. In this respect, if the edge trimming operation is slower than the drawing and ironing press output, the press operation must be periodically interrupted to allow the trimming apparatus to catch up with the press output. Alternatively, the press speed must be decreased to reduce the output rate. In either event, production rate is undesirably decreased.

Of further importance with regard to edge trimming is the capability of the apparatus to operate continuously with minimum interruption due to malfunction, and with minimum down time for repair or replacement operations. Accordingly, it becomes desirable to provide apparatus which is structurally simple and reliable in operation and in which the component parts are readily accessible and removable for maintenance and replacement purposes as well as for clearing a malfunction. All of these factors contribute to minimize down time and thus increasing production rate capability.

In accordance with the present invention, can body trimming apparatus is provided by which the foregoing desirable characteristics are achieved. More particularly, the apparatus includes a plurality of spindle units adapted to be continuously rotated along an arcuate path about a main axis. The spindle units sequentially receive can bodies to be trimmed and move the can bodies along the arcuate path and past a stationary cutting blade. Each spindle unit cooperates to receive and axially and radially position a can body to be trimmed relative to the cutting blade. Moreover, each spindle unit operates to rotate the can body thereon about the spindle axis, whereby a scrap ring is cut from the can body as the latter moves past the cutting blade. Further, the spindle units each include a pair of opposed clamping spindles and a stripper device which are axially reciprocable relative to one another to achieve the can body receiving and supporting operation and to achieve subsequent separation of the trimmed can body and scrap ring from the spindle unit for discharge from the apparatus.

Reciprocating movements of the clamping spindles and stripper device are achieved by corresponding cam and cam follower arrangements, whereby the can body receiving, supporting and discharge operations as well as the scrap ring discharge operation are positively controlled and coordinated with rotation of the spindle units about the main axis. Moreover, one of the clamping spindles of each unit is positively rotated to achieve can body rotation about the spindle axis and, preferably, is rotated through a fixed ring gear on the apparatus frame and a pinion drivingly associated with the clamping spindle. Accordingly, the rotating and reciprocating movements of the spindle unit components are not only achieved positively but through the use of components having structural integrity and minimum maintenance requirements.

Stability with regard to the axial position of a can body during movement thereof past the cutting plate is important to assure achieving a clean cut about the can body. In accordance with the present invention, such stability is achieved by providing for interengagement between the cam and cam follower arrangement of one of the clamping spindles which eliminates axial play between the cam and follower during movement of the spindle past the cutting blade. In the preferred embodiment, the one spindle is provided with a pair of rollers axially spaced apart to define a follower, and the cam includes a track received between the rollers. That portion of the track corresponding to movement of the spindle past the blade is provided with an axial thickness greater than the spacing between the rollers, thus to eliminate play between the rollers and stabilize the axial position of the spindle during the can cutting operation.

Still further, as will become apparent hereinafter, the components of the preferred embodiment of the apparatus are structured and structurally interrelated with one another in a manner which facilitates access thereto and disassembly thereof for purposes of replacement or maintenance.

It is accordingly an outstanding object of the present invention to provide improved apparatus for edge trimming the open end of a seamless metal can body.

Another object is the provision of apparatus of the foregoing character in which a can body is trimmed by arcuate displacement of the can body past a stationary cutter blade and simultaneous rotation of the can body about its axis.

Yet another object is the provision of apparatus of the foregoing character in which can bodies are continuously received and transferred along an arcuate path between input and discharge stations of the apparatus and in which the can bodies are individually rotated and trimmed during movement between the input and discharge stations.

A further object is the provision of apparatus of the foregoing character in which a spindle unit is operable to receive, support, rotate and transfer a can body to be trimmed between the input and output stations and to eject a trimmed can body and scrap ring from the apparatus at said discharge station.

Yet a further object is the provision of apparatus of the foregoing character in which a can body clamping spindle of a spindle unit is axially reciprocable during transfer of a can body between the input and output stations and is stabilized in an axial position during displacement of the can body past the cutter blade.

Still a further object is the provision of apparatus of the foregoing character which is structurally simple, reliable in operation, has a high output capability, and in which the structure and structural interrelationship between the component parts thereof facilitates maintenance and/or replacement operations.

The foregoing objects, and others, will in part be obvious and in part pointed out more fully hereinafter in conjuction with the written description of a preferred embodiment shown in the accompanying drawings in which.

Figure 1:
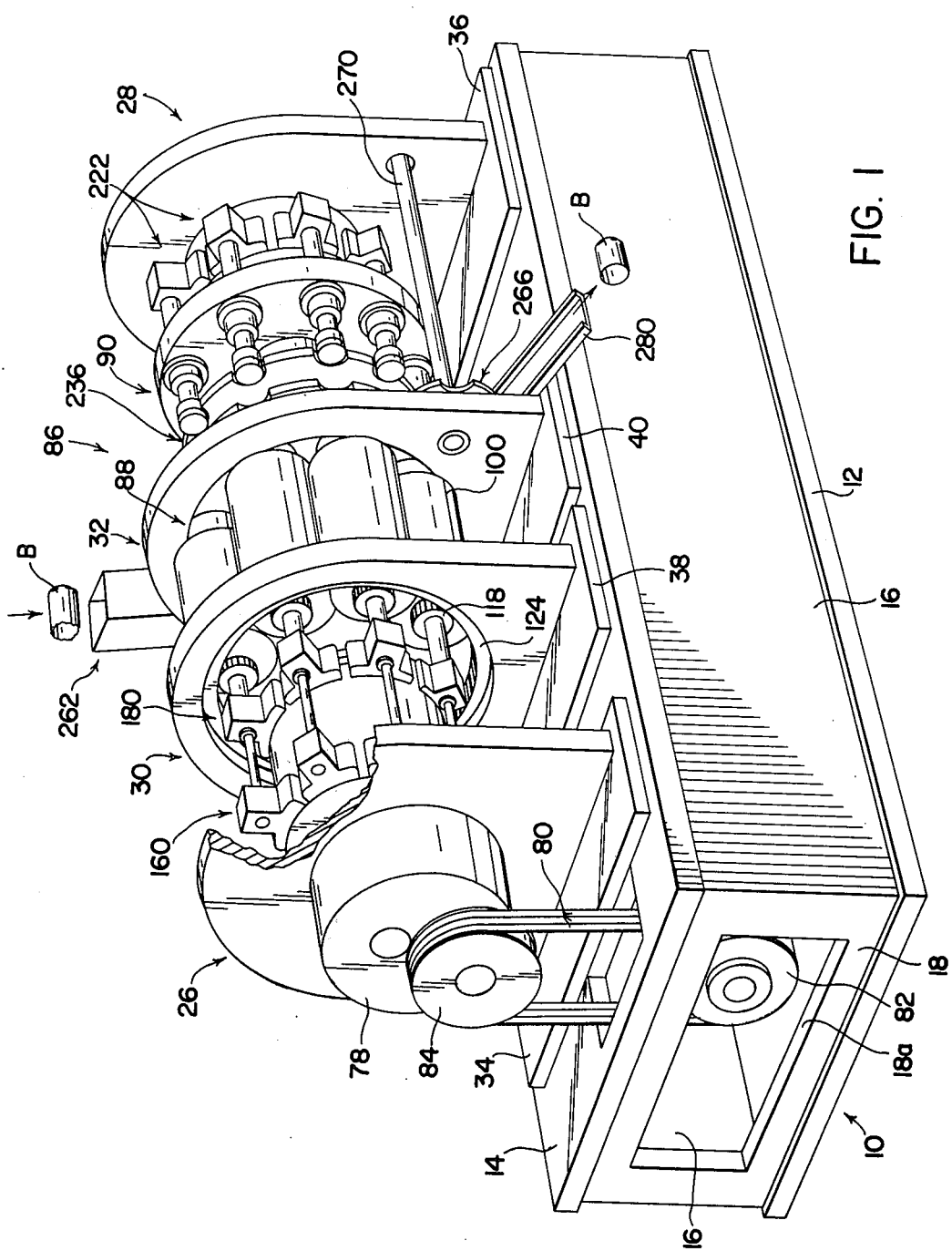
FIG. 1 is a perspective view of can trimming apparatus made in accordance with the present invention.

Referring now in greater detail to the drawings wherein the showings are for the purpose of illustrating a preferred embodiment of the invention only and not for the purpose of limiting the invention, it will be seen from FIGS. 1, 2, 4 and 5 that the apparatus includes a frame having a box-like base portion 10 comprised of a bottom plate 12, a top plate 14, side plates 16, end plates 18 and 20, and intermediate cross plate 22. A drive motor 24 is removably mounted on bottom plate 12 in the area between end plate 18 and cross plate 22, and an opening 18a through end plate 18 provides ventilation for the motor compartment. The frame further includes an upper portion comprised of upright end plate members 26 and 28 adjacent opposite ends of frame portion 10, and upright frame plates 30 and 32 intermediate end plates 26 and 28.

Frame plates 26, 28, 30 and 32 are welded or otherwise secured to corresponding base plates 34, 36, 38 and 40, respectively, which overlie top plate 14 of frame portion 10. The bottom surfaces of base plates 34, 36, 38 and 40 are provided with longitudinally extending keyways 34a, 36a, 38a, and 40a, respectively. The upper surface of top plate 14 of frame portion 10 is provided with a longitudinally extending keyway 42. The upright frame plates 26, 28, 30 and 32 are laterally positioned relative to top plate 14 of the frame and in alignment with one another by keys 44 in keyway 42 and the corresponding frame plate keyways 34a, 36a, 38a and 40a. Further, frame plates 26, 28, 30 and 32 are each removably interconnected with and longitudinally positioned relative to top plate 14 by bolts 46 extending through the corresponding base plate and into threaded engagement with openings therefor in top plate 14 of frame portion 10. The upper ends of frame plates 26, 28, 30 and 32 are releaseably interconnected in longitudinally spaced apart relationship by means of corresponding spacer tubes 48 and connector rods 50.

Figure 2:
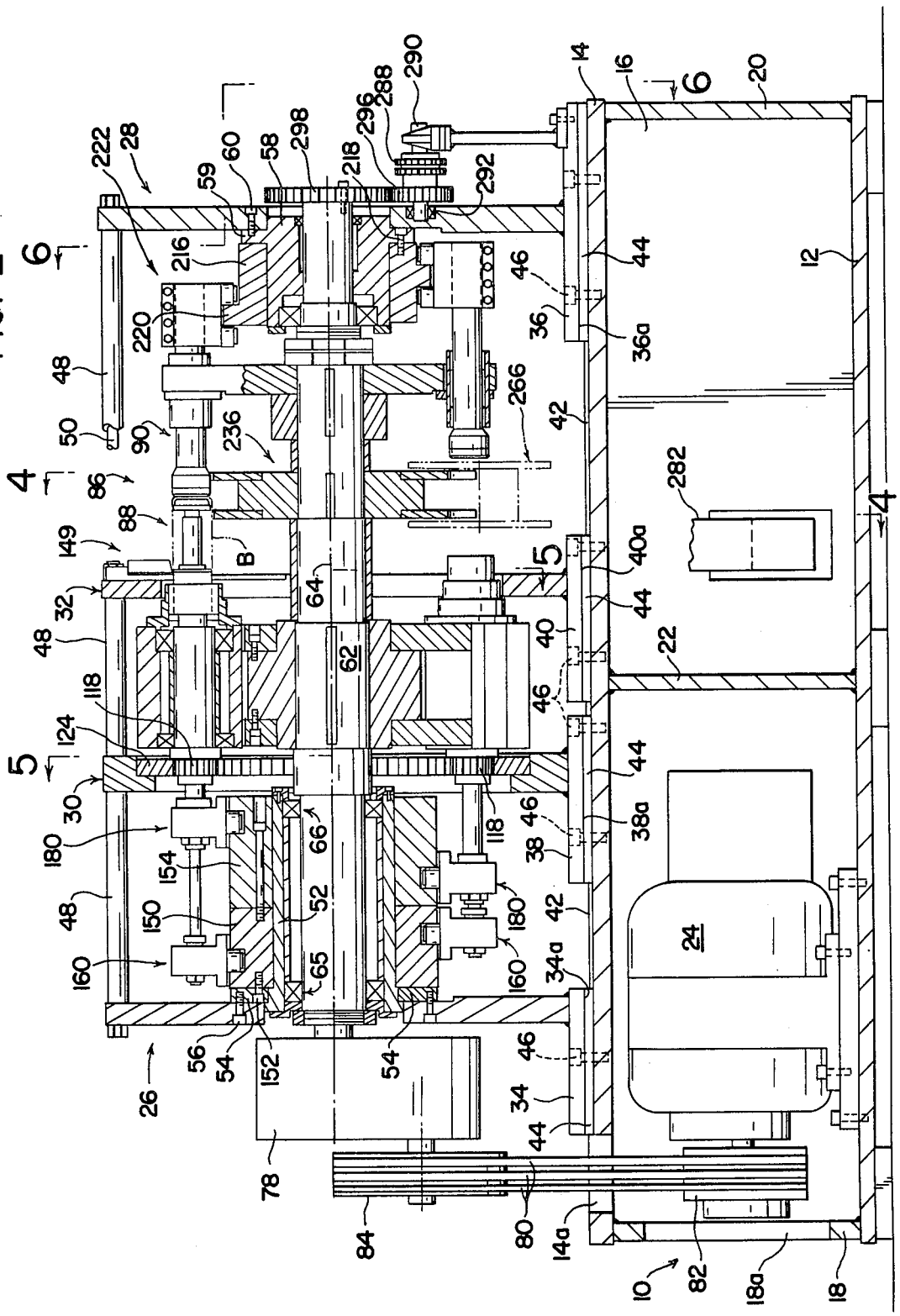
FIG. 2 is a side elevation view, in section, of the apparatus shown in FIG. 1.
Figure 3:
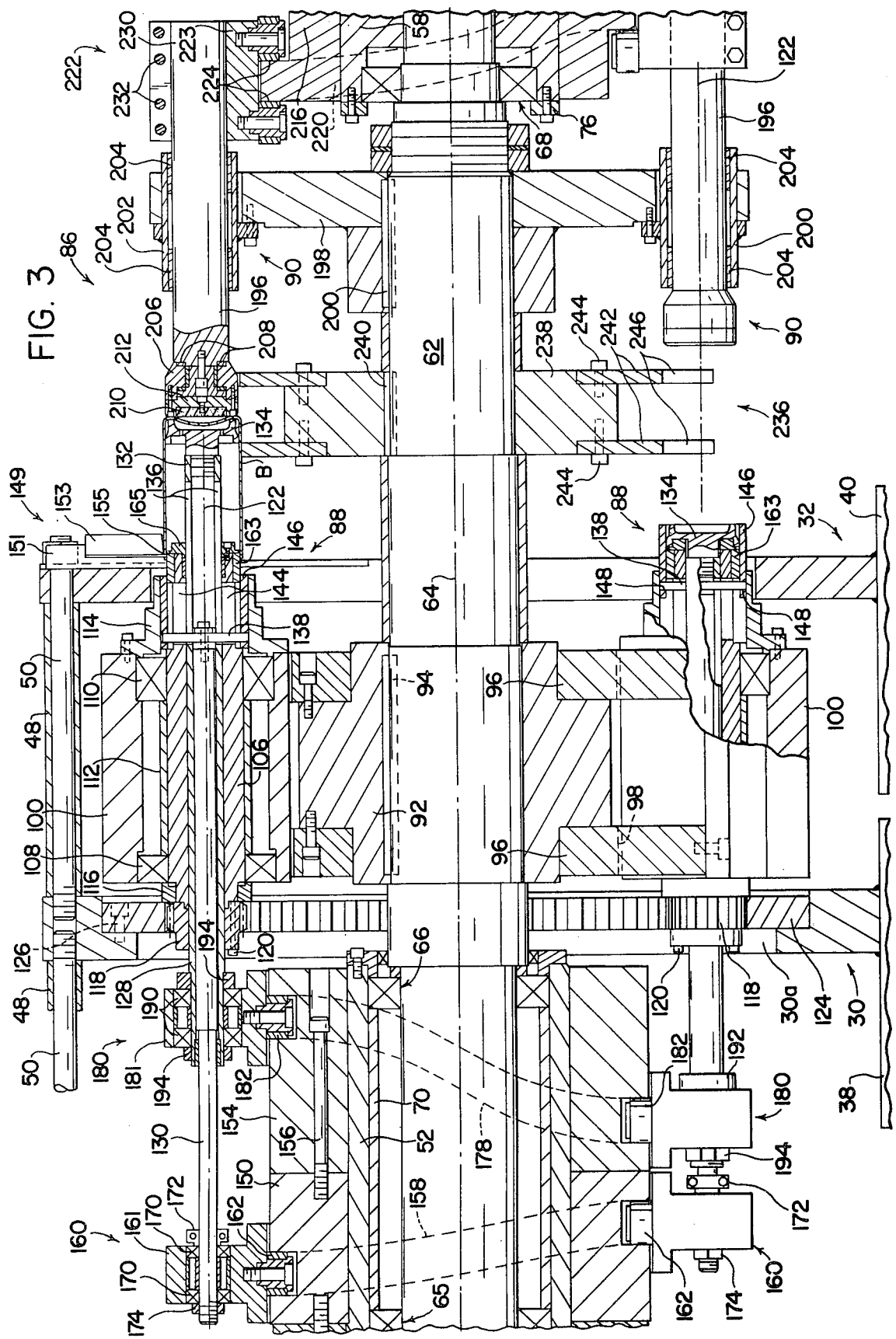
FIG. 3 is a detail view in sectional elevation of the can body clamping and scrap ring knockout spindle assemblies.

As best seen in FIGS. 2 and 3 an annular cam support sleeve 52 is removably mounted on end frame plate 26 by means of a radial mounting flange 54 which is welded to sleeve 52 and fastened to frame plate 26 by means of a plurality of bolts 56. Further, an annular cam support sleeve 58 having a radial flange 59 is removably mounted on end frame plate 28 by means of a plurality of bolts 60. A longitudinally extending drive shaft 62 is supported for rotation relative to the apparatus frame by means of bearing assemblies 65 and 66 interposed between the shaft and cam support sleeve 52, and a bearing assembly 68 interposed between the shaft and cam support sleeve 58. A spacer sleeve 70 is interposed between bearing assemblies 65 and 66 and the bearing assemblies are retained in place relative to cam support sleeve 52 by retainer rings removably fastened to the opposite ends thereof. Bearing assembly 68 is axially retained on cam support sleeve 58 by a retainer ring 76 removably fastened thereto.

The end of drive shaft 62 extending longitudinally from end frame plate 26 is keyed or otherwise interconnected with the output of a gear reducer 78. The gear reducer is driven by motor 24 through a plurality of belts 80 extending through opening 14a in frame plate 14 and trained about a variable sheave 82 mounted on the shaft of motor 24 and a sheave 84 mounted on the input shaft of gear reducer 78. Gear reducer 78 provides for drive shaft 62 to be driven continuously at a constant speed and at a desired fraction of the speed of the output shaft of motor 24.

The apparatus further includes a plurality of spindle units 86 uniformly spaced apart about drive shaft 62 and mounted thereon for rotation therewith about drive shaft axis 64. Six spindle units 86 are provided in the embodiment shown, and each of the spindle units includes a can body clamping and scrap stripper spindle assembly 88 and an axially opposed can body clamping and can body retracting spindle assembly 90. Spindle units 86 and spindle assemblies 88 and 90 thereof are identical in structure, mounting and operation and, accordingly, only one spindle unit and the mounting and operation of the components thereof will be described in detail hereinafter.

Figure 5:
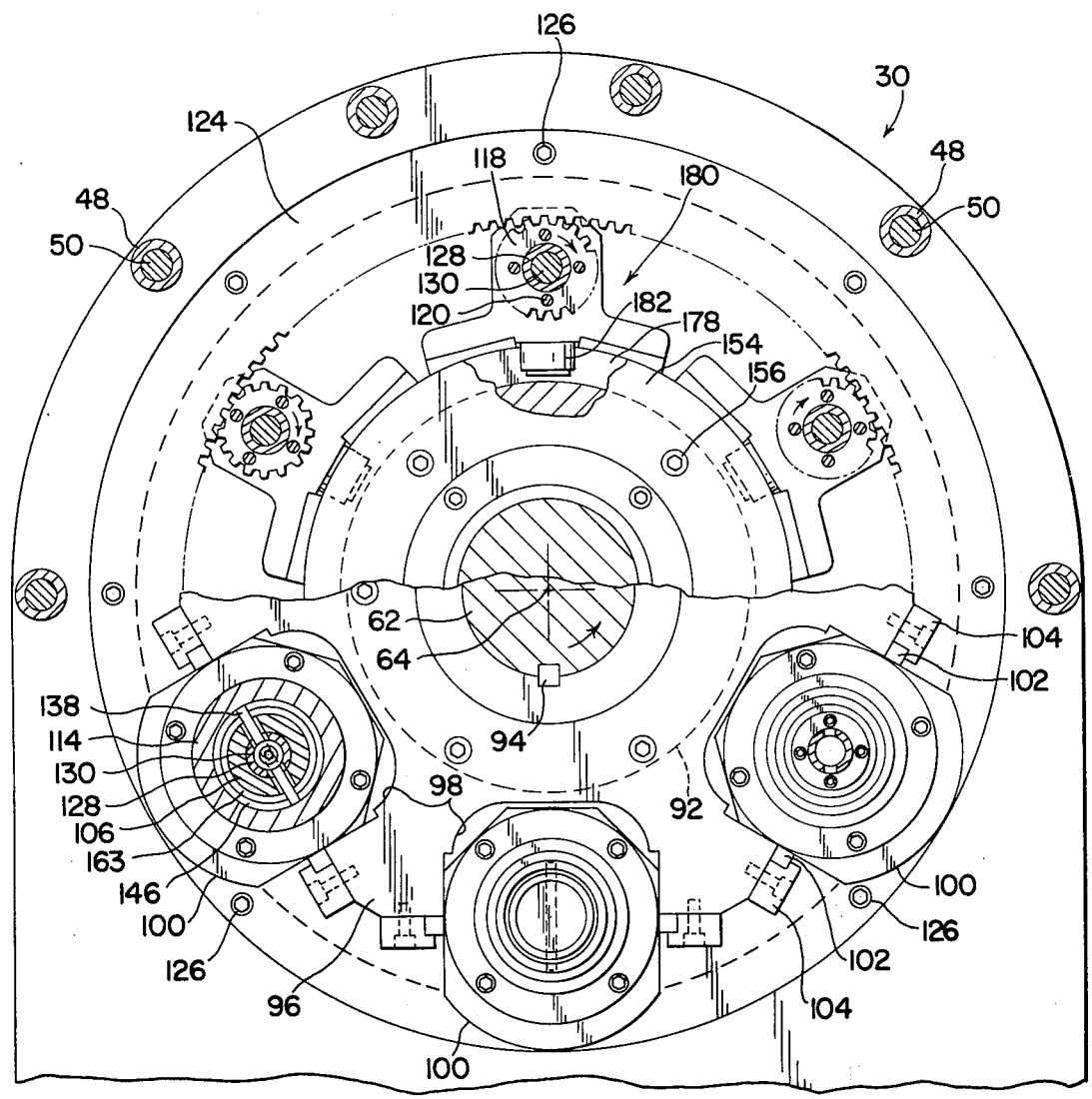
FIG. 5 is a cross-sectional view of the apparatus taken along line 5—5 in FIG. 2.

With regard first to the can body clamping and scrap stripper spindle assembly 88, as best seen in FIGS. 2 and 3, drive shaft 62 is provided with a spindle mounting hub 92 keyed to shaft 62 for rotation therewith by means of a key 94. A pair of radially extending spindle mounting plates 96 are bolted to axially opposite side faces of hub 92 and are provided with radially outwardly open pockets 98 each adapted to receive an open ended spindle housing member 100. As seen in FIG. 5, housing member 100 is provided with longitudinally extending mounting flanges 102 on diametrically opposite sides thereof, and the housing is removably attached to mounting plates 96 by corresponding clamp members 104 bolted to plates 96 and clampingly engaging flanges 102. A spindle sleeve 106 extends through housing 100 and is supported for rotation relative to the housing and against axial displacement relative thereto. More particularly, bearing assemblies 108 and 110 are interposed between housing 100 and spindle sleeve 106 and are axially spaced apart by a spacer sleeve 112. The bearings and spacer sleeve are axially retained with respect to housing 100 and sleeve 106 by means of a retainer ring 114 attached to one end of housing 100 and a retainer ring 116 clampingly mounted on spindle sleeve 106 adjacent the opposite end of housing 100 by means of a pinion gear 118.

Pinion gear 118 is coaxial with spindle sleeve 106 and is removably mounted on the spindle sleeve by a plurality of bolts 120. Accordingly, it will be appreciated that pinion 118 and spindle sleeve 106 are rotatable together about spindle axis 122. Frame plate 30 is provided with a radially stepped circular opening 30a therethrough, and an internally toothed ring gear 124 is removably mounted on gear frame plate 30 in opening 30a by means of a plurality of bolts 126. The teeth of pinion 118 and gear 124 mesh to provide for spindle sleeve 106 to rotate about spindle axis 122 in response to rotation of spindle housing 100 with spindle hub 92 about drive shaft axis 64.

Can body clamping and scrap stripper spindle assembly 88 further includes a tubular clamping spindle shaft 128 extending axially through spindle sleeve 106, and a scrap stripper shaft 130 extending axially through tubular shaft 128. Tubular shaft 128 has an outer end 132 which is internally threaded to removably receive the externally threaded neck portion of a can body clamping head 134. Further, tubular shaft 128 is provided with diametrically opposed longitudinally extending slots 136 adapted to slidably receive a cylindrical pin 138 attached to the front end of shaft 130 against rotation relative thereto by means of a washer and bolt arrangement. Slots 136 of a circumferential width generally corresponding to that of the diameter of pin 138. Spindle sleeve 106 has an outer end provided with diametrically opposed longtiudinally extending slots 144 through which pin 138 extends, and which slots 144 also have a circumferential width generally corresponding to that of the diameter of pin 138. A scrap stripper ring or sleeve 146 is disposed within bearing retainer ring 114 and is longitudinally slidable and rotatable relative thereto. Stripper ring 146 is provided at its inner end with a diametrically opposed pair of openings 148 receiving the radial outer ends of pin 138. As set forth more fully hererinafter, tubular clamping spindle shaft 128 and stripper shaft 130 are axially reciprocable relative to spindle sleeve 106 and to one another, and slots 136 and 144 enable such relative reciprocation. It will be appreciated from the foregoing description, that displacement of spindle housing 100 about drive shaft axis 64 imparts rotation to spindle sleeve 106 through ring gear 124 and pinion 118. The circumferential engagement between pin 138 and slots 136 and 144 causes tubular spindle shaft 128 and stripper shaft 130 to rotate with spindle housing 106 about spindle axis 122. Accordingly, can body clamping head 134 is rotated relative to drive shaft 62 as the latter rotates to move the spindle units about the drive shaft axis.

Figure 6:
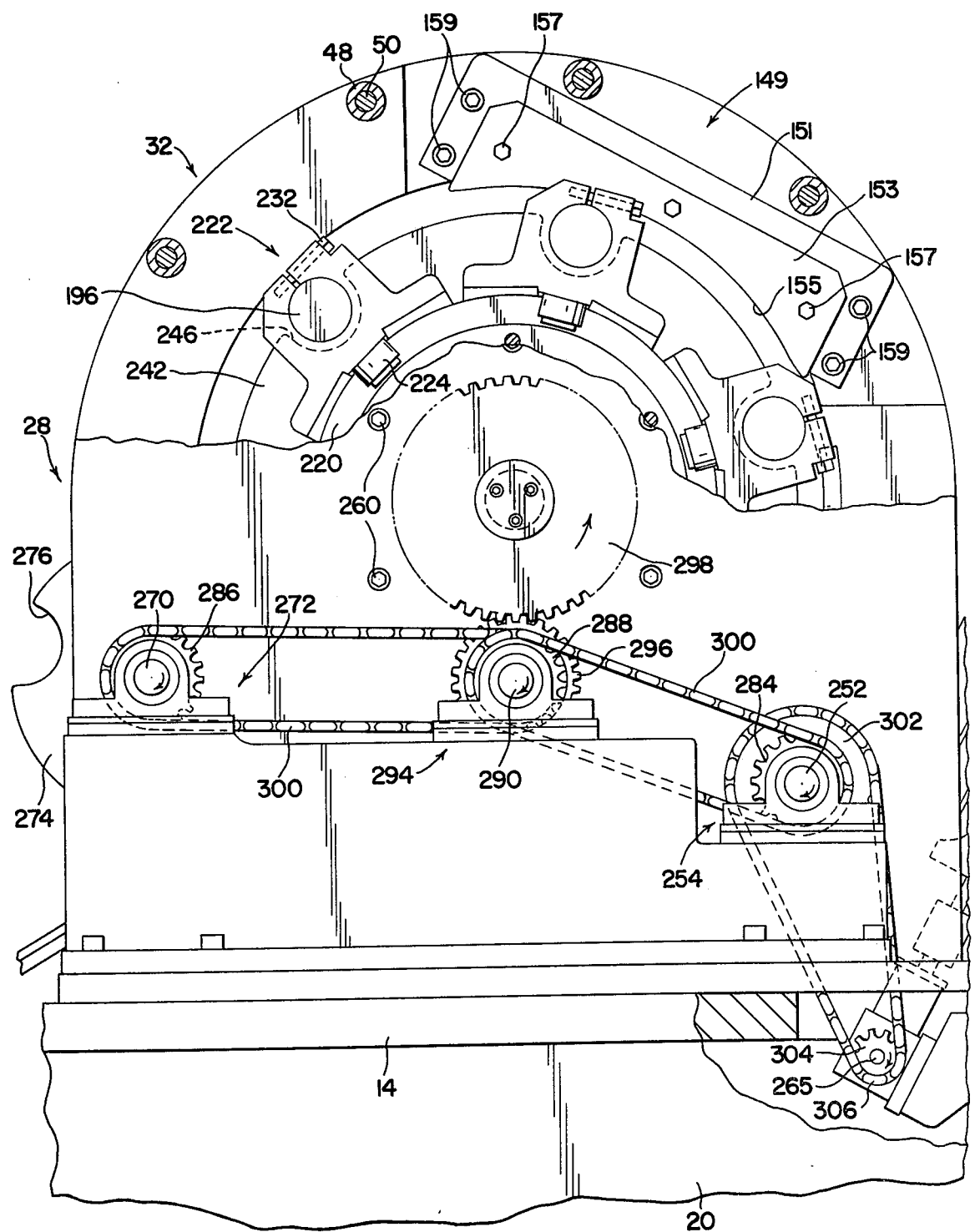
FIG. 6 is a cross-sectional elevation view taken along line 6—6 in FIG. 2.

It will be appreciated from the foregoing description that spindle sleeve 106 is axially fixed relative to upright frame plate 32. The latter plate supports a fixed external cutter blade assembly 149 comprised of a blade support member 151 and a knife blade 153 having an arcuate cutting edge 155, as best seen in FIG. 6. Blade 153 is mounted on support member 151 by bolts 157, and member 151 is removably mounted on knife holder frame plate 32 by means of a plurality of bolts 159. Cutting edge 155 is axially positiond in generally coplanar relationship with respect to the outermost end of spindle sleeve 106, and the latter end receives and supports an internal annular cutting ring 163 which is removably mounted on spindle sleeve 106 by a retaining ring 165 attached to the spindle sleeve by a plurality of bolts. Accordingly, cutting ring 163 rotates with spindle sleeve 106 and relative to cutting edge 155 of knife 153 as the spindle assembly rotates about drive shaft axis 64. During this movement of the spindle assembly and rotation of spindle sleeve 106 a can edge disposed between internal blade 161 and cutting edge 155 is severed, as set forth more fully hereinafter.

As housing 100 rotates about drive shaft axis 64 can body clamping spindle shaft 128 and clamping head 134 are axially reciprocated relative to housing 100 and spindle sleeve 106 between extended and retracted positions. Likewise, during such movement of housing 100 about the drive shaft axis, stripper shaft 130 and thus knockout sleeve 146 are axially reciprocated relative to housing 100 and spindle sleeve 106 between extended and retracted positions. The purpose of such reciprocation of shafts 128 and 130 between the respective extended and retracted positions thereof is set forth hereinafter, and the reciprocating movements are achieved by means of corresponding cam and cam follower arrangements. More particularly, as shown in FIGS. 2, 3 and 5, an annular scrap stripper cam 150 surrounds cam support sleeve 52 and is attached to flange 54 thereof against rotation relative to the frame by means of a plurality of bolts 152. An annular clamping cam 154 also surrounds cam support sleeve 52 and is mounted against rotation relative to the frame by means of a plurality of bolts 156 extending through openings in cam 154 and into corresponding threaded openings in cam 150.

Cam 150 is provided with a peripherally continuous cam track recess 158 in the outer surface thereof contoured in the axial direction to provide the desired axial displacement of scrap stripper shaft 130, as set forth more fully hereinafter. A cam follower 160 is provided for scrap stripper shaft 130 and includes a body 161 and a cam roller 162 depending therefrom and received in recess 158. Roller 162 is supported for rotation about a radial axis by means of a threaded stud attached to the follower body and a bushing between the stud and roller. Follower body 161 is apertured to receive the inner end of shaft 130, and bearing assemblies 170 are interposed between the follower body and shaft 170 to support the latter for rotation relative to the follower. Further, bearing retainers 172 and 174 are mounted on the shaft on axially opposite sides of follower body 161 so that axial displacement of the follower imparts axail reciprocation to scrap stripper shaft 130.

Clamping cam 154 is provided with a peripherally continuous cam track recess 178 having an axial contour corresponding to the desired axial displacement of cam clamping spindle shaft 128, as set forth more fully hereinafer. A cam follower 180 is provided for spindle shaft 128 and includes a follower body 181 and a cam roller 182 depending therefrom and received in recess 178. Roller 182 is mounted on body 181 for rotation about a radial axis by a stud and bushing arrangement. Follower body 181 is apertured to receive the inner end of spindle shaft 128, and the latter shaft is supported for rotation relative to the follower body by means of a pair of bearing assemblies 190. Bearing retainers 192 and 194 are attached to shaft 128 so that axial displacement of follower 180 imparts axial displacement to shaft 128.

With regard now to can body clamping and can body retracting spindle assembly 90, as best seen in FIGS. 2, 3 and 6, the latter assembly includes a spindle shaft 196 coaxial with spindle shafts 128 and 130 and mounted on drive shaft 62 for rotation therewith and axial displacement relative thereto. More particularly, a spindle support plate 198 is mounted on drive shaft 62 such as by means of a key 200. Plate 198 is provided with apertures to which bushing sleeves 202 are secured such as by welding. Each spindle shaft 196 is supported for axial sliding movement relative to plate 198 by bushings 204 interposed between shaft 196 and sleeve 202. The axial outer end of spindle shaft 196 is provided with a can clamping head 206 which is mounted thereon for rotation relative to shaft 196 by suitable bearings including thrust bearings 208. A permanent magnet disc 210 is mounted on the outer end of head 206 by means of a magnet mounting member 212 which is attached to head 206 by means of a plurality of bolts. The purpose of magnet 210 and rotation of head 206 relative to spindle shaft 196 is set forth more fully hereinafter.

Axial reciprocation of shaft 196 relative to drive shaft 62 is achieved by a corresponding cam and cam follower arrangement. More particularly, an annular cam 216 surrounds cam support sleeve 58 and is attached to flange 59 thereof by means of a plurality of bolts 218. Thus, cam 216 is fixed against rotation relative to the apparatus frame. Cam 216 is provided with a peripherally continuous cam track 220 extending radially from the outer surface thereof and having an axial contour corresponding to the desired axial displacement of spindle shaft 196. A cam follower 222 is disposed on cam 216 and includes a follower body 223 and a pair of cam rollers 224 depending therebeneath on axially opposite sides of cam track 220. Each roller 224 is mounted on follower body 223 for rotation about a radial axis by means of a corresponding bolt and bushing assembly. Spindle shaft 196 has an inner end 230 which is clamped to follower body 223 against rotation relative thereto. In this respect, follower body 223 is provided with a longitudinally split cylindrical opening receiving shaft end 230, and bolts 232 clampingly grip the shaft end.

It will be appreciated from the foregoing description of spindle assemblies 88 and 90, that rotation of drive shaft 62 rotates spindle shafts 128, 130 and 196 and their respective followers 180, 160 and 222 about drive shaft axis 64 and relative to their respective cams 154, 150 and 216. It will be further appreciated that during such rotation follower rollers 182, 162 and 224 cooperatively interengage with the corresponding cam track to axially reciprocate spindle shafts 128, 130 and 196 between the extended and retracted positions thereof and for the purposes set forth hereinafter.

A main turret 236 is mounted on drive shaft 62 for rotation therewith and for the purpose of receiving and positioning can bodies relative to the spindle units and discharging trimmed can bodies from the apparatus. More particularly and with reference to FIGS. 3 and 4, the main turret includes a hub member 238 mounted on the shaft for rotation therewith by means of a key 240. Further, a pair of turret plates 242 are mounted on axially opposite sides of hub 239 by means of bolts 244, and plates 242 are provided with axially aligned pairs of can body receiving recesses 246 opening radially outwardly of the plates. Each pair of recesses 246 is axially aligned with a corresponding one of the spindle units 86.

A rotatable in-feed turret 248 is provided on one side of the frame adjacent the lower portion of main turret 236. In-feed turret 248 includes a hub portion 250 mounted on a shaft 252. Shaft 252 is parallel to drive shaft 62 and is supported for rotation by means of a pair of pillow block support assemblies, not illustrated, which are mounted on top plate 14 of frame portion 10.

Figure 4:
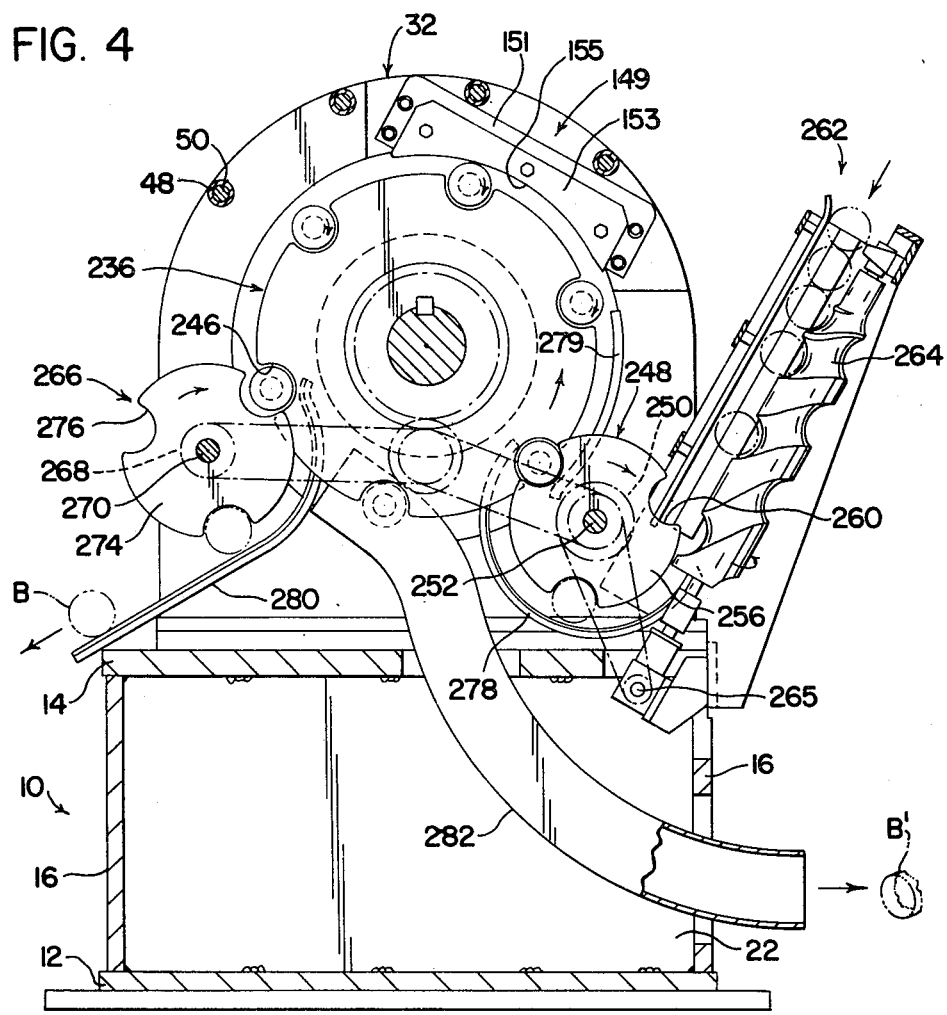
FIG. 4 is a cross-sectional elevation view of the apparatus taken laong line 4—4 in FIG. 2.

A pair of turret plates 256, one of which is seen in FIG. 4, are attached to axially opposite sides of hub 250 by means of bolts, not illustrated, and plates 256 are provided with axially aligned can body receiving recesses 260 opening radially outwardly thereof. A can body feed mechanism 262 is provided to deliver cans to be trimmed to in-feed turret 248. Feed mechanism 262 includes a rotatable helical feed screw 264 which, in a well known manner, is operable to space and feed can bodies to the apparatus in timed relationship to one another. The feed screw is rotated through a shaft 265 driven in the manner set forth hereinafter.

A discharge turret 266 is provided on the opposite side of the frame from in-feed turret 248 and is similar in structure to the in-feed turret. In this respect, the output turret includes a hub 268 on a shaft 270 which is parallel to drive shaft 62 and is supported for rotation by suitable pillow block support assemblies, not illustrated. A pair of turret plates 274 are mounted on axially opposite sides of hub 268 such as by bolts and are provided with axially aligned pairs of can body receiving recesses 276 opening radially outwardly therefrom. Plates 256 of in-feed turret 248 and plates 274 of discharge turret 266 are axially spaced apart to receive plates 242 of main turret 236 therebetween, as shown in FIG. 2 with respect to discharge turret 266. Further, in-feed turret 248 and discharge turret 266 are each radially related to main turret 236 such that the plates of the turrets radially overlap. Moreover, rotation of the turrets is coordinated for the recesses thereof to move into cooperative circumferential alignment to achieve can body transfer operations therebetween.

Arcuate in-feed guides 278 and 279 are associated with feed mechanism 262, in-feed turret 248 and main turret 236 to achieve in-feed and guidance of can bodies to the main turret and spindle units. A discharge guide 280 is associated with discharge turret 266 and main turret 236 to facilitate the discharge of trimmed cans from the apparatus. Further, a scrap ring discharge tube 282 is provided adjacent the lower portion of main turret 236 and to the side thereof toward spindle assemblies 88 to receive the ejected scrap rings and guide the discharge thereof from the apparatus, as set forth hereinafter.

Drive shaft 252 of in-feed turret 248 and drive shaft 270 of discharge turret 266 each extend axially from the respective turret through end frame plate member 28 and have driven ends adjacent the latter frame plate. Shafts 252 and 270 are supported for rotation adjacent the driven ends thereof by corresponding pillow block support assemblies 254 and 272. Shafts 252 and 270 are adapted to be driven continuously and in synchronism with drive shaft 62. More particularly, the driven end of shaft 252 is provide with a sprocket wheel 284 and the driven end of shaft 270 is provided with a sprocket wheel 286. Sprocket wheels 284 and 286 are each aligned with the corresponding one of the sets of teeth on a double sprocket wheel 288 mounted on a shaft 290 having its opposite ends rotatably supported by a bearing assembly 292 on frame plate 28 and a pillow block assembly 294 spaced from frame plate 28. A gear 296 is mounted on shaft 290 for rotation therewith and is driven by a gear 298 mounted on the outer end of drive shaft 62 for rotation therewith. Sprocket chains 300 couple sprocket wheel 288 with a corresponding one of the sprocket wheels 284 and 286, whereby rotation of drive shaft 62 imparts rotation to the in-feed and discharge turrets. Further, in-feed turret shaft 252 and feed screw driven shaft 265 are provided with sprocket wheels 302 and 304, respectively. Sprocket wheels 302 and 304 are coupled by a sprocket chain 306, whereby rotation of shaft 252 operates to drive feed screw 264. Feed screw 264 is of course rotated in synchronism with input turret 248 and main turret 236 to coordinate the delivery of a can body from the feed screw with the receiving positions of the can body receiving recesses of the turrets.

In operation, drive motor 24 operates to continuously rotate drive shaft 62 whereby in-feed screw 264, in-feed turret 248, main turret 236, and discharge turret 266 are continuously rotated about their respective axes and spindle units 86 are continuously rotated about axis 64 of the drive shaft. Further, as hereinabove described, rotation of spindle units 86 about drive shaft axis 64 imparts rotation to spindle shafts 128 and 130 and thus spindle head 134 and stripper sleeve 146 through interengagement of pinions 118 with ring gear 124. Simultaneously, such rotation of spindle units 86 about the drive shaft axis imparts reciprocating movements to spindle shafts 128, 130 an 196 and thus to spindle head 134, stripper ring 146 and spindle head 206, through the corresponding cam and cam follower arrangement. These rotating and reciprocating movements of the spindle components together with rotation of the turrets and feed screw cooperatively provide for a can body to be trimmed during movement between input and output stations of the apparatus and in the manner described hereinafter.

A plurality of can bodies B to be trimmed are supplied to in-feed assembly 262 with the can bodies oriented for the open ends thereof to face spindle assemblies 88. As will be understood from FIG. 4, rotation of feed screw 264 delivers a can body into a given pocket 260 of in-feed turret 248 as the pocket passes the lower end of the feed screw. Pocket 260 and arcuate in-feed guide 278 cooperate to guide movement of the can toward main turret 236. The can body is transferred to a main turret pocket 246 when the latter becomes positionally coordinated with the in-feed turret pocket, and the main turret pocket 246 and arcuate guide 279 then cooperate to displace the can upwardly in the direction toward cutter blade assembly 149. At the time of transfer of can body B to main turret pocket 246, spindle heads 134 and 206 are in th retracted positions thereof as shown in the lower portion of FIG. 3, and stripper ring 146 is in the retracted position thereof as shown in the upper portion of FIG. 3. Thus, can body B is received in turret pocket 246 axially between and in alignment with the spindle assemblies. At a predetermined time thereafter, cam recess 178 in cam 154 and follower 180 cooperate to displace can clamping shaft 128 and thus spindle head 134 axially outwardly from the retracted position and into the open end of can body B. At the same time cam track 220 and follower 222 cooperate to displace spindle shaft 196 and thus spindle head 206 axially outwardly toward the closed end of can body B. The movement of spindle head 206 axially displaces can body B relative to main turret 236 and to the position illustrated in the upper portion of FIG. 3 in which an axial portion of the open end of can body B overlies cutter ring 163. When the spindle heads reach the fully extended positions thereof, the bottom wall of can body B is captured between the spindle heads. This takes place before the spindle assemblies and can body reach the leading end of stationary cutter blade 153.

Figure 7:
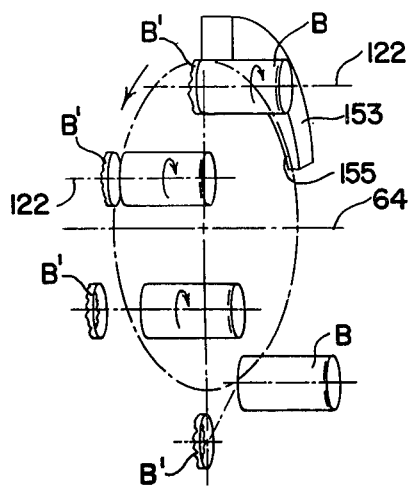
FIG. 7 is a schematic illustration of the can body trimming operation.

Clamping of the bottom wall of can body B between heads 134 and 206 causes the can body to be rotated by spindle head 134, and spindle head 206 rotates therewith as a result of the rotatable mounting thereof on spindle shaft 196. The rotating can body is then moved past cutter blade 153, as illustrated schematically in FIG. 7. During such movement, the rotating can body engages cutting edge 155 of blade 153 which cooperates with internal knife ring 163 to sever end portion B' from the can body. The arcuate extent of cutting edge 155 is such that the can body makes one complete revolution about spindle axis 122 during movement of the can body and spindle assembly past the cutting edge.

Following the severing operation, cam recess 178 of cam 154 and cam follower 180 cooperate to axially displace can clamping shaft 128 and spindle head 134 toward the retracted position thereof. At the same time, cam track 220 of cam 216 cooperates with follower 222 to axially displace spindle shaft 196 and spindle head 206 toward the retracted position thereof. The retracted positions of spindle heads 134 and 206 are shown in the lower portion of FIG. 3. In the embodiment disclosed, can bodies B are produced from steel and thus are retained in engagement with spindle head 206 by magnet 210 during the retracting movement of spindle shaft 196. Accordingly, upon retraction of spindle shaft 196 the trimmed can body is again axially aligned with pocket 246 of main turret 236, and the can body is retained in the pocket by magnetic attraction for the remainder of the movement thereof toward the discharge station.

When spindle head 206 and can body B reach the discharge station, the trimmed can body engages the upper end of discharge guide chute 280 and becomes captured between pocket 246 of main turret 236 and a pocket 276 of discharge turret 266, as shown in FIG. 4. Thereafter, pocket 276 of the discharge turret and the arcuate portion of discharge chute 280 cooperate to strip the trimmed can from magnet 210 on spindle head 206 and to transfer the trimmed can to discharge chute 280 for discharge by gravity from the apparatus.

During movement of the can body and spindle assemblies from the input station past stationary cutter blade 153, cam recess 158 of cam 150 and follower 160 cooperate to maintain stripper ring 146 in the retracted position relative to internal cutter ring 163. Accordingly, scrap ring B' remains on knife ring 163 following the severing thereof from the can body. After the spindle assemblies pass stationary cutter blade 153 and following displacement of spindle head 134 to the retracted position thereof, cam recess 158 of cam 150 and follower 160 cooperate to displace stripper shaft 130 and thus stripper ring 146 to the extended position thereof shown in the lower portion of FIG. 3. This movement of the stripper ring displaces scrap ring B' from cutter ring 163 and spindle head 134, and the scrap ring falls into the upper end of discharge chute 282. Thereafter, cam recess 158 and follower 160 cooperates to displace stripper ring 146 axially inwardly of spindle 106 to the retracted position thereof.

In performing a can body end trimming operation it is of course desirable to achieve as clean a cut as possible about the periphery of the can body. In accordance with another aspect of the present invention, this end result is achieved by stabilizing the axial position of spindle assembly 90 relative to cutter blade 153 and spindle assembly 88 during movement of the corresponding spindle unit 86 past the cutter blade. Spindle assembly 90 is in the extended position during such movement past the cutter blade. As described more fully hereinafter, axial stability preferably is achieved by providing for the portion of cam track 220 of cam 216 corresponding to the extended position of spindle assembly 90 to have an axial thickness greater then the spacing between follower rollers 224 so as to eliminate any play between the cam and follower components.

Figure 8:
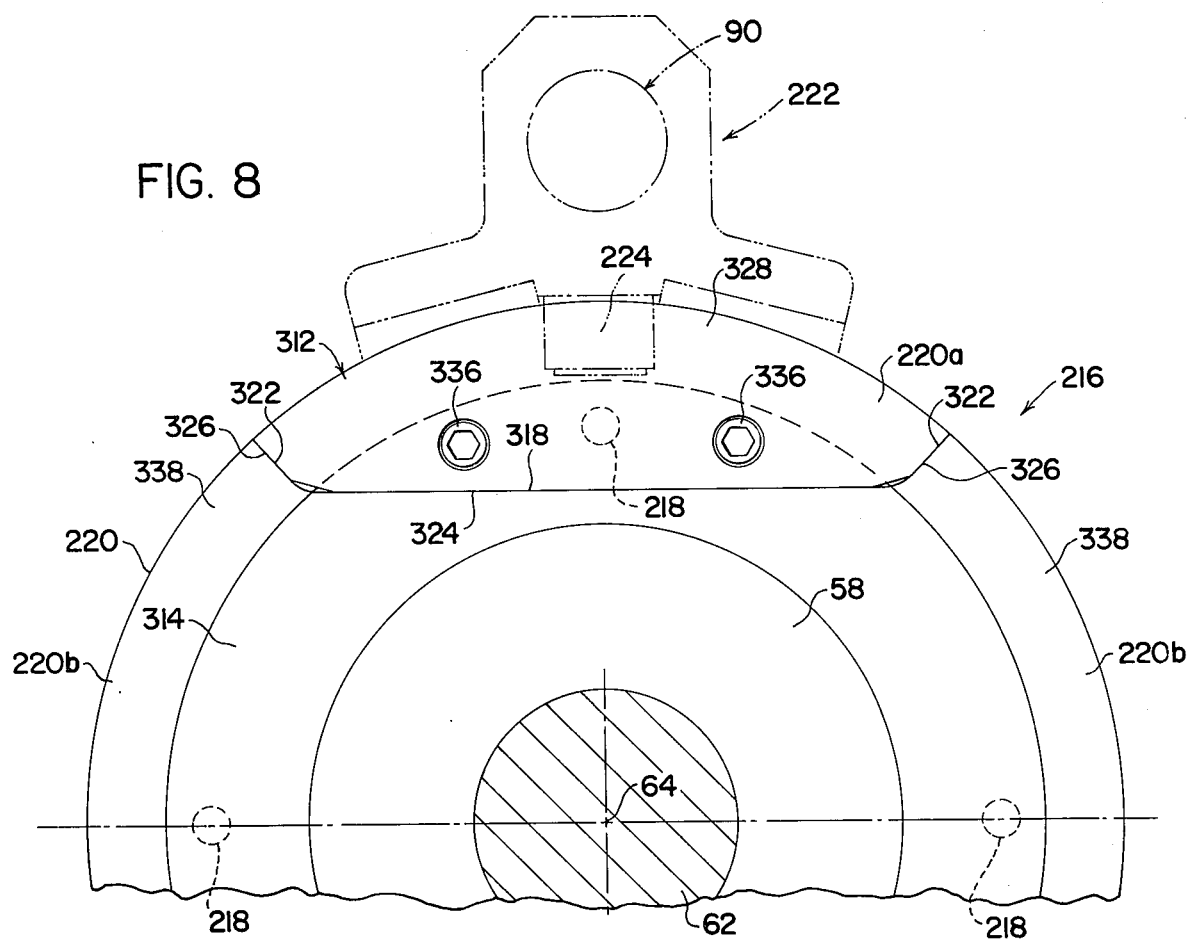
FIG. 8 is an enlarged end elevation view of a clamping spindle cam taken along line 8—8 in FIG. 2.
Figure 9:
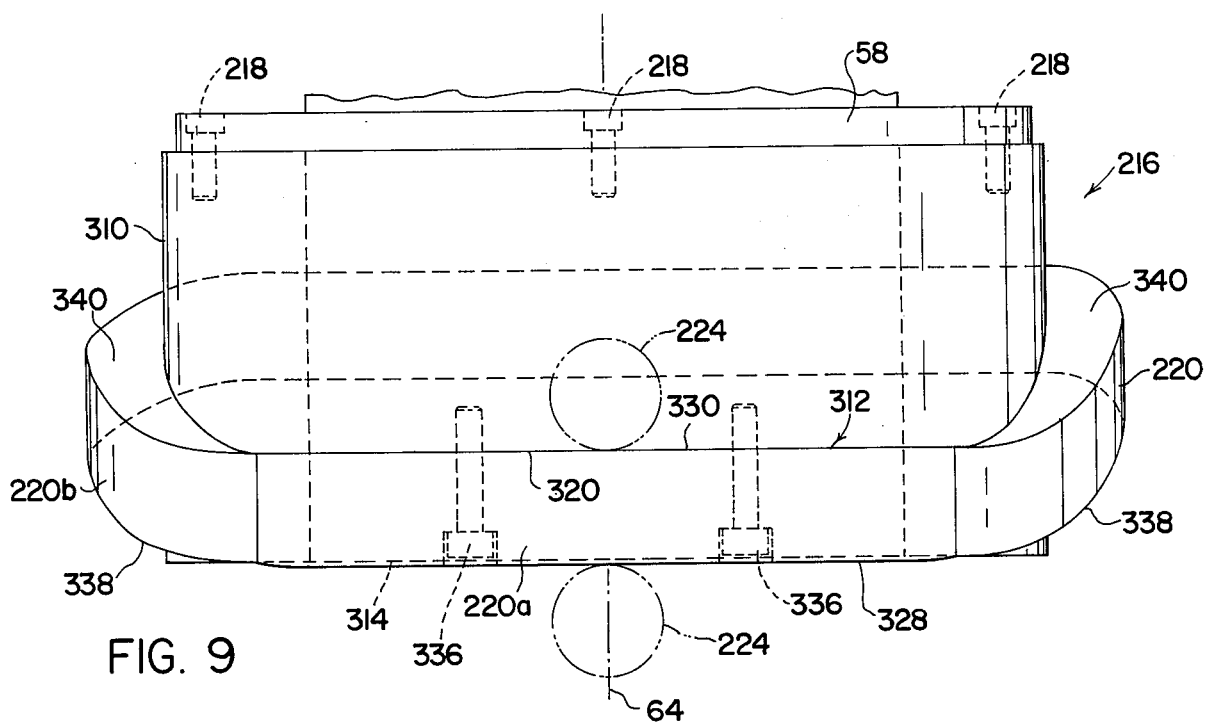
FIG. 9 is a plan view of the cam shown in FIG. 8.
Figure 10:
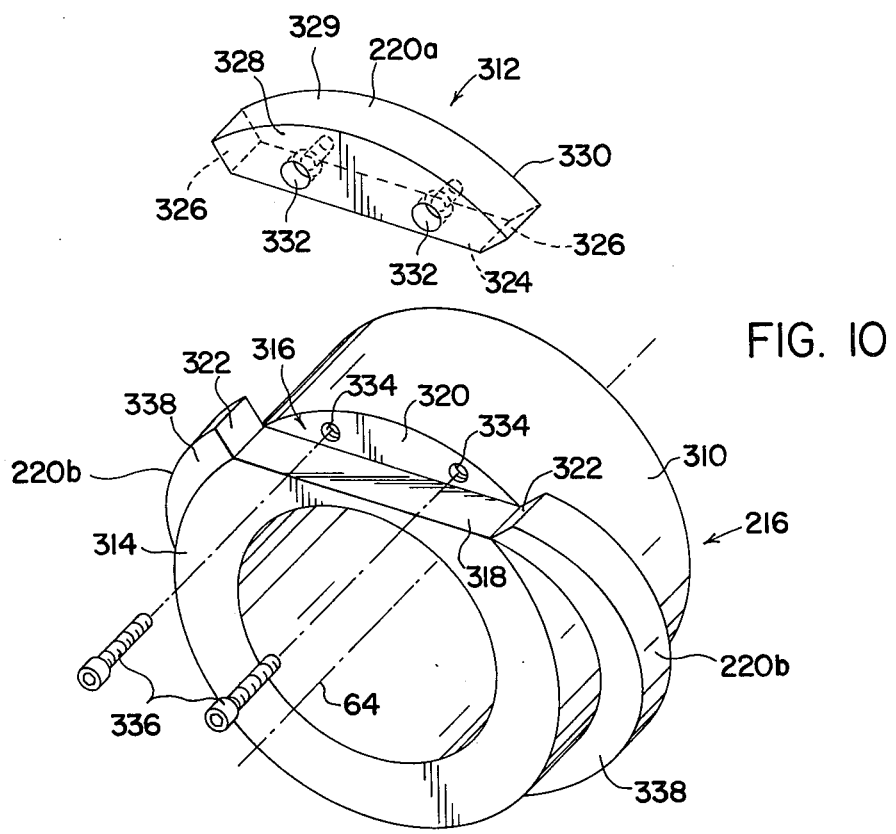
FIG. 10 is an exploded perspective view of the cam components.

A preferred embodiment of the structure of cam 216 by which the foregoing spindle stabilization is achieved is illustrated in FIGS. 8, 9 and 10 of the drawing. Referring to these FIGURES, cam 216 includes a cylindrical body 310 concentric with axis 64 of shaft 62 and adapted to be mounted on the apparatus frame in the manner described hereinbefore. Cam track 220 extends about the outer surface of body 310 and is axially contoured for follower rollers 224 to displace spindle assembly 90 between extended and retracted positions as previously described. More particularly, cam track 220 has a first circumferential portion 220a corresponding to the extended position of spindle assembly 90, and a remaining circumferential portion 220b corresponding to displacements of the spindle assembly from the extended to the retracted position and from the retracted to the extended position.

In the preferred embodiment, track portion 220b is integral with cam body 310, and track portion 220a is defined by an insert 312 removably mounted in a recess provided therefor in the cam body. More particularly in this respect, cam body 310 includes a planar front face 314 and a recess 316 extending axially inwardly from the face 314. Recess 316 includes a bottom wall 318 and a rear wall 320 perpendicular to the bottom wall and intersecting the outer surface of the body. The circumferentially opposite ends of recess 316 are defined by radially extending planar faces 322 each defining the corresponding end of track portion 220b.

Insert 312 has a bottom surface 324 and radially extending end faces 326, which bottom surface and end faces facially engage bottom wall 318 and end faces 322 of recess 316. Insert 312 further includes planar front and rear walls 328 and 330, respectively, and rear wall 330 abuts against recess wall 320 when the insert is positioned in the recess. Additionally, insert 312 includes an arcuate top surface 329 having a radius of curvature relative to axis 64 corresponding to that of track portion 220b. Insert 312 is provided with openings 332 therethrough and cam body 310 is provided with threaded openings 334 in alignment with openings 332. The insert is removably mounted on cam body 310 by means of a pair of threaded studs 336 which extend through openings 332 and into threaded engagement with openings 334 in the cam body.

It will be appreciated from the previous description of cam follower rollers 224 and cam track 220 that the rollers engage the axially opposite faces of the cam track such that movement of the rollers along the track impart axial displacement to can clamping spindle assembly 90. Walls 328 and 330 of insert 312 respectively define the axially opposite front and rear track faces for track portion 220a, and the axially opposite front and rear faces of track portion 220b are respectively designated by numerals 338 and 340 in FIGS. 8–10. The opposite ends of front face 338 of track portion 220b intersect end faces 322 of recess 316 in the plane of front face 314 of cam body 310, and the opposite ends of rear face 340 intersect recess faces 332 in the plane of back wall 320 of the recess. Accordingly, it will be appreciated that when insert 312 is mounted on the cam body the circumferentially opposite ends of rear surface 330 of the insert coincide with the corresponding end of rear face 340 of track portion 220b. As seen in FIG. 9, the axial thickness of insert 312 provides for front face 328 thereof to be axially spaced outwardly from front face 314 of the can body. Accordingly, the plane of front face 328 of the insert is axially spaced from the opposite ends of front face 338 of track portion 220b at the points of intersection of the latter face with recess faces 322. As will become apparent hereinafter, such spacing is exaggerated in FIG. 9 for purposes of illustration.

The axes of cam follower rollers 224 are spaced apart a fixed distance to provide a spacing between the outer peripheries of the rollers to receive the cam track. Track portion 220b has axial dimensions along the length thereof which provides for a certain amount of axial play between the rollers and this cam track portion during movement of the rollers therealong. This axial play is minimal and tolerable in that the movements of the spindle assembly 90 provided thereby precede and follow the cutting operation and do not require axial stability of the spindle. During the cutting operation, however, axial play even though minimal affects the ability to obtain a clean cut about the periphery of the can end. By increasing the axial dimension of the cam track along the length thereof corresponding to movement of the can body past the cutter blade, axial play is eliminated between the follower rollers and cam track, whereby the axial position of the spindle is stabilized during the end trimming operation. In the preferred embodiment, such increase in the axial dimension of the cam track is provided by the insert 312 having the relationship described above with respect to the spacing of front face 328 thereof from the opposite ends of front face 338 of track portion 220b. Accordingly, it will be appreciated from FIG. 9, that movement of rollers 224 onto the opposite faces of insert 312 reduces or eliminates free play in that the axial spacing between surfaces 328 and 330 is greater than that between front and rear faces 338 and 340 of track portion 220b. Preferably, the thickness of insert 312 between faces 328 and 330 is greater than the spacing between the peripheries of rollers 224, thus to load the rollers and eliminate free play.

As an example of the desired cam track and follower relationship, the axes of follower rollers 224 in the preferred embodiment herein illustrated and described are spaced apart 3.000 inches, and each of the rollers has a diameter between 1.4995 and 1.5000 inches. These diameters provide for a spacing between the peripheries of the rollers of from 1.500 inches to 1.5005 inches. The opposite sides of track portion 220b have an axial dimension of between 1.4990 and 1.5000 inches. These dimensions of the rollers and track portion 220b permit minimal axial free play of spindle assembly 90 relative to track portion 220b. Insert 312 has an axial thickness of from 1.5025 to 1.5030 inches. Accordingly, the insert thickness is greater than the spacing between the peripheries of the rollers by from 0.0020 to 0.0030 inch. This increased thickness provides for excluding axial free play between the rollers and insert, thus to stabilize spindle assembly 90 against axial displacement during translation of a can body thereon past the cutter blade. The increased thickness of insert 312 exerts forces on the roller elements, roller bearing and bearing supports which would lead to excess wear of these components if the entire cam track were of the same axial thickness. Accordingly, the axial dimension of track portion 220b advantageously permits axial play in order to avoid such wear.

It will be appreciated of course that the circumferential length of insert 312 is at least equal to or greater than the circumferential length of the cutter blade required to achieve the desired end trimming during translation of a can body past the cutter blade. Preferably, the circumferentially opposite ends of insert 312 each extend about 5° beyond the corresponding end of the cutter blade. This advantageously provides for assuring that spindle assembly 90 is axially stabilized before engagement of the can body with the cutting edge of the blade. It will be further appreciated that cam 216 is circumferentially oriented relative to axis 64 for insert 312 to be properly oriented circumferentially relative to the cutter blade. While increased cam track thickness is provided in accordance with the preferred embodiment by means of an insert removably mounted on the cam body, it will be readily apparent that the desired cam track and follower relationship can be achieved by other structural arrangements.

While considerable emphasis has been placed herein on the structures of and the structural interrelationships between the component parts of the apparatus disclosed, it will be appreciated that many changes can be made in the preferred embodiment without departing from the principles of the present invention. For example, while the apparatus is disclosed for use with steel can bodies and a magnet is employed to achieve retraction of the trimmed can body into proper position with respect to the main turret, it will be appreciated that the invention is applicable to trimming bodies of metals other than steel, such as aluminum, and that in such a case a vacuum arrangement could be employed to achieve the retraction of the trimmed can body with spindle head 206. Further, it will be appreciated that more or less than six spindle assemblies can be employed, and that spindle shaft 196 and head 206 could be rigidly interconnected and shaft 196 rotatably interengaged with follower 222 in a manner similar to the shaft components of spindle assembly 88 to achieve reciprocation and rotation thereof. Other embodiments of the present invention, and the foregoing and other modifications of the preferred embodiment, will be apparent upon reading and understanding the description of the preferred embodiment. Accordingly, it is to be distinctly understood that the foregoing descriptive matter is to be interpreted merely as illustrative of the present invention and not as a limitation.

We claim:

1. Apparatus for edge trimming the open end of a cup-shaped metal can body comprising, a frame, can body supporting spindle means having a spindle axis, means for supporting and moving said spindle means and a can body supported thereby along an arcuate path relative to said frame, said arcuate path having a second axis radially spaced from and parallel to said spindle axis, cutter means supported by said frame at a location along said path, and means to rotate said spindle means and said can body supported thereby about said spindle axis during movement of said spindle means and can body about said second axis and past said cutter means, said cutter means being positioned on said frame to sever an axial portion from the open end of said rotating can body moving therepast.

2. Apparatus according to claim 1, wherein said cutter means includes blade means having an arcuate cutting edge along said path, said cutting edge having a length such that said rotating can makes at least one revolution during movement therepast.

3. Apparatus according to claim 1, wherein said spindle means includes axially opposed first and second can body clamping spindle means, said means for supporting and moving said spindle means along said path including means supporting said first and second clamping spindle means for axial reciprocation between corresponding extended and retracted positions, and means to reciprocate said first and second clamping spindle means between said extended and retracted positions thereof.

4. Apparatus according to claim 3, wherein said means to reciprocate said first and second clamping spindle means is corresponding cam and follower means including cam means on said frame and cam follower means interconnected with said first and second clamping spindle means.

5. Apparatus according to claim 3, wherein said spindle means includes scrap stripper means coaxial with said first clamping spindle means, said means for supporting and moving said spindle means along said path including means supporting said stripper means for axial reciprocation relative to said first clamping spindle means and between extended and retracted positions, and means to reciprocate said scrap stripper means between said extended and retracted positions thereof.

6. Apparatus according to claim 5, wherein said means to reciprocate said first and second clamping spindle means and said scrap stripper means is corresponding cam and cam follower means including cam means on said frame and cam follower means interconnected with said first and second clamping spindle means and said scrap stripper means.

7. Apparatus according to claim 5, wherein said means to rotate said spindle means includes a gear fixed on said frame and pinion in meshing engagement with said gear, said spindle means further including means drivingly interconnecting said pinion with said first clamping spindle means.

8. Apparatus according to claim 7, wherein said means to reciprocate said first and second clamping spindle means and said scrap stripper means is corresponding cam and cam follower means including cam means on said frame and cam follower means interconnected with said first and second clamping spindle means and said scrap stripper means.

9. Apparatus according to claim 5, wherein said first and second clamping spindle means have corresponding head means engaging opposite sides of the bottom wall of a cup-shaped can body supported thereby when said first and second clamping spindle means are in the extended positions thereof, said head means of said second clamping spindle means including holding means to maintain said bottom wall in engagement therewith during movement of said first and second clamping spindle means from the extended toward the retracted positions thereof.

10. Apparatus according to claim 9, wherein said holding means is magnet means on said head of said second clamping spindle means.

11. Apparatus according to claim 9, wherein said means to reciprocate said first and second clamping spindle means and said scrap stripper means is corresponding cam and cam follower means including cam means on said frame and cam follower means interconnected with said first and second clamping spindle means and said scrap stripper means.

12. Apparatus according to claim 9, wherein said means to rotate said spindle means includes a gear fixed on said frame and a pinion in meshing engagement with said gear, said spindle means further including means drivingly interconnecting said pinion with said first clamping spindle means.

13. Apparatus according to claim 12, and means to feed a can body to said spindle means including means defining arcuate pocket means axially aligned with said first and second clamping spindle means and movable therewith along said path, said pocket means receiving a can body to be trimmed when said first and second clamping spindle means are in the retracted positions thereof, and means to discharge a trimmed can body from said spindle means including means cooperable with said pocket means to strip said can body from said holding means of said second clamping spindle means.

14. Apparatus according to claim 1, wherein said spindle means includes can body clamping spindle means and said means for supporting and moving said spindle means along said path includes means supporting said clamping spindle means for axial reciprocation between extended and retracted positions, cam track means on said frame, and cam follower means on said clamping spindle means interengaging said cam track means to reciprocate said clamping spindle means in response to rotation of said spindle means about said second axis, said cam track means including a first portion corresponding to said extended position of said clamping spindle means and a remaining portion and said first portion including means cooperable with said cam follower means to axially stabilize said clamping spindle means in said extended position.

15. Apparatus according to claim 14, wherein said cam track means includes a cam track having axially opposite faces and said cam follower means includes rollers having outer peripheries axially spaced to receive said opposite faces therebetween, and said first portion of said cam track means having an axial dimension between said faces greater than the spacing between said outer peripheries of said rollers.

16. Apparatus according to claim 15, wherein said cam track means includes a cylindrical body having said cam track extending circumferentially thereabout, said first portion of said cam track means being an insert attached to said body.

17. Apparatus for edge trimming the open end of a cup-shaped metal can body comprising, a frame, a drive shaft supported by said frame for rotation about a shaft axis, a plurality of can body supporting spindle units having corresponding spindle axes parallel to and circumferentially spaced apart about said shaft axis, means mounting said spindle units on said drive shaft for rotation therewith, each said spindle units including axially opposed first and second can body clamping spindles, said mounting means including means supporting each said first and second clamping spindles for axial reciprocation between corresponding extended and retracted positions and said first clamping spindle for rotation about said spindle axis, means for rotating said first clamping spindles about the corresponding spindle axis during rotation of said spindle units about said shaft axis, means to reciprocate said first and second clamping spindles between the extended and retracted positions thereof during rotation of said spindle units about said shaft axis, each said spindle units moving a can body supported thereby along an arcuate path relative to said frame and simultaneously rotating said can body about the corresponding spindle axis, cutter means including a cutter blade on said frame having a cutting edge extending along said path and positioned to sever an axial portion from the open end of a rotating can body moving along said path, means to rotate said drive shaft, means to feed can bodies to be trimmed sequentially to said spindle units, means to discharge trimmed can bodies from said spindle units, and means to discharge said severed axial portion of said can body from said spindle units.

18. Apparatus according to claim 17, wherein said means to reciprocate each of said second spindles is a cam fixed on said frame and having a cam track surrounding said shaft axis and follower means engaging said track and interconnected with said second spindles, said track having a first circumferential portion corresponding to the extended position of said second spindle and a remaining portion, and said first portion including means cooperable with said follower means to axially stabilize said second spindle in said extended position.

19. Apparatus according to claim 18, wherein said cam track has axially opposite faces and said cam follower means includes rollers having outer peripheries axially spaced to receive said opposite faces therebetween, and said first portion of said cam track having an axial dimension between said faces greater than the spacing between said outer peripheries of said rollers.

20. Apparatus according to claim 19, wherein said cam includes a cylindrical body having said cam track thereon, said first portion of said cam track being an insert removably attached to said body.

21. Apparatus according to claim 17, wherein said means to discharge said severed axial portion of said can body is provided on each stripper unit and includes stripper means coaxial with said first clamping spindle, said mounting means including means supporting said stripper means for axial reciprocation relative to said first clamping spindle, and means to reciprocate said stripper means during rotation of said spindle units about said shaft axis.

22. Apparatus according to claim 21, wherein said means to reciprocate said first and second spindles and said stripper means is corresponding cam and cam follower means each including a cam fixed on said frame and having a cam track surrounding said shaft axis and a follower engaging said track and interconnected with the corresponding one of said first and second spindles and said stripper means.

23. Apparatus according to claim 22, wherein said means to rotate said first clamping spindles about the corresponding spindle axis includes a ring gear mounted on said frame and a pinion drivingly interconnected with each said first clamping spindle and rotated by said gear upon rotation of said spindle units about said shaft axis.

24. Apparatus according to claim 23, wherein said first and second clamping spindles have corresponding head means engaging opposite sides of the bottom wall of a can body therebetween when said spindles are in the extended positions thereof, said head means of said second clamping spindle including holding means to maintain said bottom wall and thus said can body in engagement therewith upon movement of said first and second spindles from the extended to the retracted positions thereof.

25. Apparatus according to claim 24, wherein said cam track corresponding to said second spindles has axially opposite faces and said cam follower corresponding to each said second spindles includes rollers having outer peripheries axially spaced to receive said opposite faces therebetween, said cam track corresponding to said second spindles having a first portion corresponding to the extended position of said second spindles, and said first portion of said cam track having an axial dimension between said faces greater than the spacing between said outer peripheries of said rollers.

26. Apparatus according to claim 25, wherein said cam corresponding to said second spindles includes a cylindrical body, and said first portion of said cam track is an insert attached to said body.

27. Apparatus according to claim 24, wherein said means to discharge trimmed can bodies from said spindle units include means along said path to engage and separate said can body from said holding means.

28. Apparatus according to claim 27, wherein said means to feed can bodies to said spindle units includes main turret means mounted on said shaft for rotation therewith and having arcuate can body receiving pockets axially aligned with each spindle unit, and input turret and guide means including a rotatable input turret for delivering can bodies sequentially to said pockets while said first and second clamping spindles are in the retracted positions thereof.

29. Apparatus according to claim 28, wherein said means along said path to engage and separate said can body from said holding means is discharge turret and guide means including a rotatable discharge turret receiving said separated can body, and means for rotating said input and discharge turrets in synchronism with said main turret.

30. Apparatus according to claim 22, wherein each said first clamping spindle includes a tubular shaft having axially outer and inner ends and said stripper means includes a stripper shaft in said tubular shaft and having a first end between said outer and inner ends and a second end extending rearwardly from said inner end of said tubular shaft, said tubular shaft having longitudinally extending slot means adjacent said outer end, pin means attached to said first end of said stripper shaft and extending radially through said slot means, said stripper means further including a stripper sleeve coaxial with and surrounding said tubular shaft, said pin means interengaging with said sleeve for said sleeve to move therewith, said slot means providing for relative axial reciprocation between said tubular shaft and said stripper shaft, said follower for said first clamping spindle being interconnected with said inner end of said tubular shaft, and said follower for said stripper means being interconnected with said second end of said stripper shaft.

31. Apparatus according to claim 30, wherein said means supporting said first clamping spindle for rotation about said spindle axis includes a rotatable spindle sleeve coaxial with and surrounding said tubular shaft, said sleeve having a first end radially between said stripper sleeve and tubular shaft, said first end of said spindle sleeve having longitudinal slot means to receive said pin means, said spindle sleeve having a second end, a drive pinion on said second end, a ring gear fixed on said housing and meshing with said pinion to rotate said pinion and spindle sleeve upon rotation of said spindle unit about said drive shaft axis, said slot means in said first end of said spindle sleeve permitting axial displacement of said stripper shaft and pin means relative to said spindle sleeve and engaging said pin means to rotate said stripper shaft and thus said tubular shaft.

32. Apparatus according to claim 31, wherein said second clamping spindle includes a second spindle shaft having an outer end facing said first clamping spindle and an inner end, a spindle head mounted on said outer end of said second shaft for rotation relative thereto about said spindle axis, said follower for said second clamping spindle being clampingly engaged with said inner end of said second shaft to prevent rotation of said second shaft about said spindle axis.

33. Apparatus according to claim 32, wherein said spindle head on said second spindle shaft includes a permanent magnet member mounted thereon for rotation therewith.

34. Apparatus according to claim 32, wherein said cam track corresponding to said second spindles has axially opposite faces and said cam follower corresponding to each second spindles includes rollers having outer peripheries axially spaced to receive said opposite faces therebetween, said cam track corresponding to said second spindles having a first portion corresponding to the extending position of said second spindles, and said first portion of said cam track having an axial dimension between said faces greater than the spacing between said outer peripheries of said rollers.

35. Apparatus according to claim 34, wherein said cam corresponding to said second spindles includes a cylindrical body, and said first portion of said cam track is an insert attached to said body.

* * * * *